No. 12,828. REISSUED JULY 7, 1908.

E. R. HOBBS.

RINGER FOR TELEPHONES AND THE LIKE.

APPLICATION FILED DEC. 17, 1906.

Witnesses:
E. Edmonston Jr.
James A. Marr

Inventor:
Elbert R. Hobbs
by Edward E. Clement
Att'y.

UNITED STATES PATENT OFFICE.

ELBERT RADOLPH HOBBS, OF LAMAR, COLORADO, ASSIGNOR, BY MESNE ASSIGNMENTS, TO THE DEAN ELECTRIC COMPANY, A CORPORATION OF OHIO.

RINGER FOR TELEPHONES AND THE LIKE.

No. 12,828. Specification of Reissued Letters Patent. Reissued July 7, 1908.

Original No. 809,060, dated January 2, 1906, Serial No. 232,117. Application for reissue filed December 17, 1906. Serial No. 348,368.

*To all whom it may concern:*

Be it known that I, ELBERT RADOLPH HOBBS, a citizen of the United States, and a resident of Lamar, in the county of Prowers and State of Colorado, have invented a new and Improved Ringer for Telephones and the Like, of which the following is a full, clear, and exact description.

My invention relates to electric ringers, and admits of general use, but is of peculiar value on telephone lines.

The purpose of my improvement is to produce a more efficient type of ringer provided with various adjustments and admitting of a number of distinct uses.

Reference is to be had to the accompanying drawings, forming a part of this specification, in which similar characters of reference indicate corresponding parts in all the figures.

Figure 2:
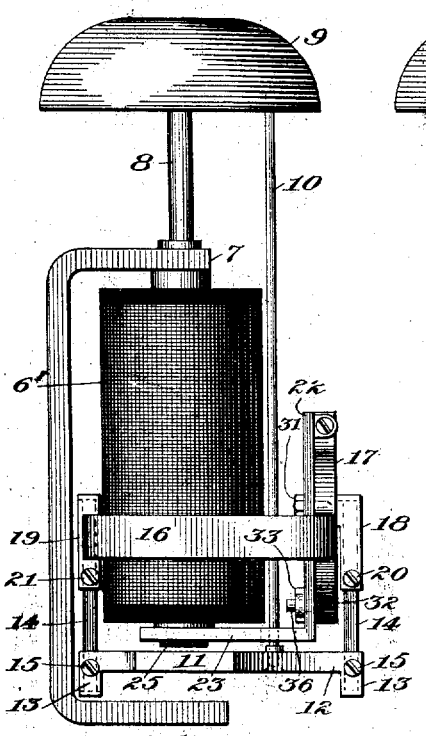
Figure 1:
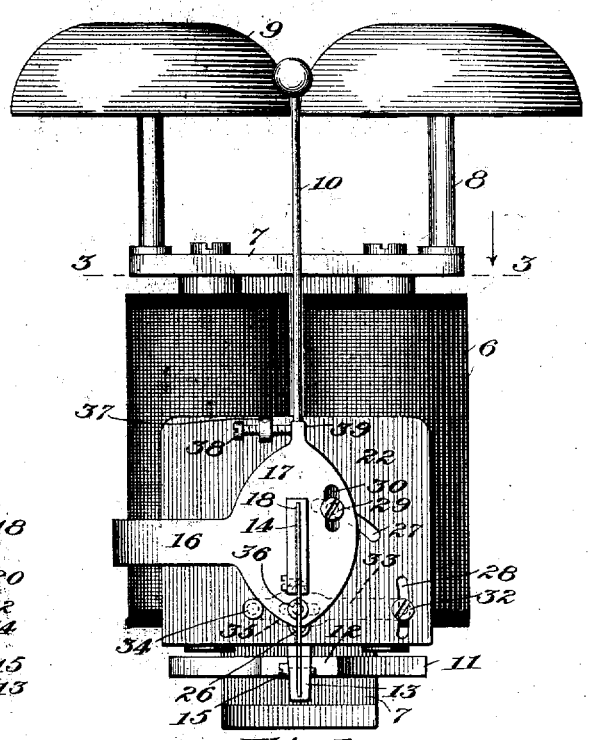
Figure 4:
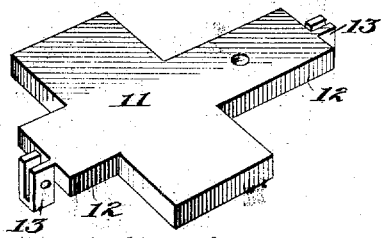
Figure 3:
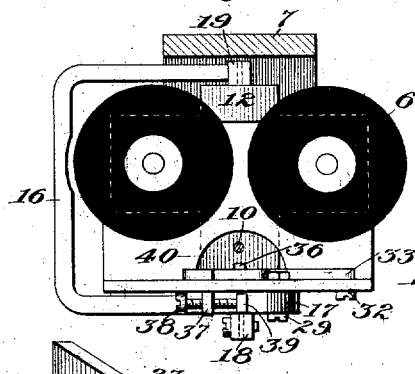
Figure 5:
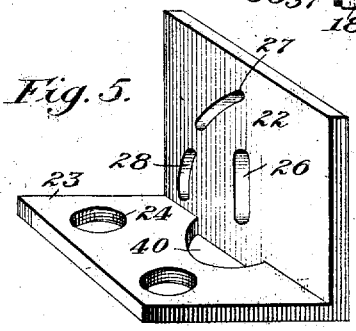

Figure 1 is a front elevation of my improved ringer. Fig. 2 is a side elevation of the same viewed as from the left of Fig. 1. Fig. 3 is a horizontal section upon the line 3 3 of Fig. 1 looking in the direction of the arrow and showing certain parts in plan. Fig. 4 is a perspective view of the armature and a part of the means for suspending the same, and Fig. 5 is a perspective view of the L-shaped plate upon which certain adjusting mechanisms are mounted.

The electromagnet is shown at 6, the permanent or polarizing magnet at 7, the bell stems at 8, and the twin bells at 9. The clapper is shown at 10 and the armature of the magnet at 11. This armature is provided with trunnions 12 integral therewith and with brackets 13, oppositely mounted upon the trunnions. These brackets are engaged by pendent leaf-springs 14, secured to the brackets 13 by means of screws 15. A yoke 16 is integrally provided with a head 17 and with brackets 18 19, which engage the upper ends of the springs 14 and are secured to these springs by means of screws 20 21. Two flat members 22 23 are integrally connected together and constitute an L-shaped supporting plate. (Shown to better advantage in Fig. 5.) The holes 24 in the member 23 are threaded, and fitted into them are the magnetic cores 25. A vertical slot 26 and two arcuate slots 27 28 are provided in the member 22. A screw 29, passing through the slot 27 and a slot 30 in the head 17 and provided with a nut 31, is used for adjusting the head 17 relatively to the supporting plate. Another screw 32 passes through the slot 28 and is mounted upon a radially movable arm 33, which, by means of a pivot 34, is mounted upon the L-shaped supporting-plate. This arm 33 is provided with a slot 35, extending in the general direction of the arm, and passing through this slot and through the slot 26 is a pivot 36. An ear 37 is integrally mounted upon the portion 22 of the said L-shaped plate and is engaged by an adjusting screw 38, which lodges against a boss 39, integral with the head 17. The member 23 of the supporting-plate is cut away at 40, as shown in Figs. 3 and 5.

The action of my device is as follows: The tension of the springs 14 tends to hold the armature 11 in such position that its ends will be equidistant from the magnetic cores 25. Any sticking of the armature relatively to the magnetic cores is thus prevented, and any residual magnetism which may influence either magnetic core is thus prevented from holding the clapper 10 in such position as to "stick" to either of the twin bells. It will be understood, of course, that in most ordinary ringers the clapper is liable to stick, so that sometimes an impulse fails to cause the bell to work. By my arrangement the clapper is always held in neutral position and is free to move in either direction, according to the polarity of the magnet 6. If now it be desired to move the armature 11 nearer to the magnetic core, the screws 29 and 32 are loosened, the arm 33 is slightly raised, and the screws are tightened. This angular movement of the arm 33 raises the pivot 36 and causes the head 17, carrying with it the yoke 16, to be raised slightly, so that the armature is now a little nearer the magnetic cores. In doing this neither pole of the armature is drawn nearer to its appropriate core than is the case with the opposite pole. If, however, it be desired to operate the device as a biased ringer, this is accomplished by adjusting the head 17 by means of the arcuate slot 27. The head 17 is swung upon the pivot-pin 36, which is the center of the circle of which the arcuate slot may be considered as a part. The movement of the screw 29 relatively to the slot 27 is therefore such that within reasonable limits the head 17 may be swung upon the pivot-pin 36 as a center, and as the yoke 16 is integral with the head 17 the brackets 18 19 must necessarily turn to the same angle. The result is that the free end of the armature 11 is brought into close proximity with the neighboring magnetic core 25, so that the armature 11 can be given a slight inclination in either direction. This adjustment, as will be observed, is independent of the vertical adjustment of the armature.

By various combinations of the two adjustments above described the armature 11 can be made to assume an indefinite variety of positions relative to the magnet, and therefore serves to greatly increase the utility of the ringer when employed in various kinds of telephony and for purposes independent thereof.

It will be noted that in adjusting the armature relatively to the electromagnetic cores 25 it is also necessarily adjusted relatively to the permanent or polarizing magnet 7.

While I show a pair of twin bells actuated by a clapper, I do not limit myself to this particular acoustic mechanism, for obviously the rocking of the armature may be made to sound an alarm in many other ways.

Having thus described my invention, I claim as new and desire to secure by Letters Patent—

1. The combination of a magnet, a supporting-plate, mechanism connected with said supporting-plate and adjustable relatively thereto, said mechanism being provided with brackets, springs connected with said brackets and depending therefrom, an armature mounted upon said springs and free to rock by the resilience thereof, and means for adjusting the position of said brackets relatively to said supporting-plate.

2. The combination of a magnet, a supporting-plate disposed adjacent thereto and provided with a slot, a yoke provided with a portion disposed adjacent to said supporting-plate and provided with a fastening member extending through said slot for the purpose of enabling said portion to be adjusted to different angles relatively to said supporting-plates, springs connected with said yoke and depending therefrom, an armature mounted upon said springs and free to vibrate by the resilience thereof, a clapper mounted upon said armature and adapted to be actuated thereby, and a bell to be struck by said armature.

3. The combination of a magnet, a supporting-plate disposed adjacent thereto, a yoke provided with a head disposed adjacent to said supporting-plate, means for adjusting said head relatively to said supporting-plate, brackets mounted upon said head and upon said yoke respectively, springs adjustably mounted within said brackets and depending therefrom, an armature mounted upon said springs, a clapper supported by said armature, and bells to be struck by said clapper.

4. The combination of a magnet, a supporting-plate disposed adjacent thereto, an arm mounted upon said supporting-plate and provided with a slot, a yoke supported by said supporting-plate and provided with a head, a member mounted upon said head and projecting through said slot in said arm, means for moving said arm into different radial positions for the purpose of adjusting said head relatively to said supporting-plate, springs connected with said head and with said yoke, an armature mounted upon said springs, a clapper connected with said armature and actuated by movements thereof, and bells to be struck by said clapper.

5. The combination of a bracket provided with a slot and with a boss, an adjusting plate provided with a slot encircling said boss, and with a slot crossing said slot in said bracket, a bolt passing through the two slots thus crossed, means for clamping said bolt relatively to said bracket and said adjusting plate so as to hold the latter in predetermined fixed positions, a rocking armature supported by said adjusting plate, and magnetic mechanism for actuating said armature.

6. In a telephone ringer, the combination of a pair of electromagnets, a yoke of magnetic material connecting adjacent ends of the electromagnets, a pair of gongs rigidly supported from such yoke, a plate supported from the effective ends of such electromagnets, an armature supported in operative relation to the effective poles by resilient means carried by such plate, a clapper carried by the armature and adapted to strike the gongs, such resilient means adapted to maintain the clapper between and out of contact with the gongs when the electromagnets are not energized, and means for adjusting such resilient supporting means relatively to such plate to vary the magnetic effort exerted upon the armature by a given energizing current in the electromagnets.

7. In a telephone ringer, the combination of a pair of electromagnets, a yoke of magnetic material connecting adjacent ends of the electromagnets, a pair of gongs rigidly supported from such yoke, a plate supported from the effective ends of such electromagnets, an armature supported in operative relation to the effective poles by resilient means carried by such plate, a clapper carried by the armature and adapted to strike the gongs, such resilient means adapted to maintain the clapper between and out of contact with the gongs when the electromagnets are not energized, and means for adjusting such resilient supporting means angularly relative to such plate to equalize the magnetic efforts exerted by the two effective poles upon the armature by a given energizing current in the electromagnets.

8. In a telephone ringer, the combination of a pair of electromagnets, a yoke of magnetic material connecting adjacent ends of the electromagnets, a pair of gongs rigidly supported from such yoke, a plate supported from the effective ends of such electromagnets, an armature supported in operative relation to the effective poles by resilient means carried by such plate, a clapper carried by the armature and adapted to strike the gongs, such resilient means adapted to maintain the clapper between and out of contact with the gongs when the electromagnets are not energized, and means for adjusting such resilient supporting means angularly relative to such plate to render unequal the magnetic efforts exerted by the two effective poles upon the armature by a given energizing current in the electromagnets.

9. In a telephone ringer, the combination of a pair of electromagnets, a yoke of magnetic material connecting adjacent ends of the electromagnets, a pair of gongs rigidly supported from such yoke, a plate supported from the effective ends of such electromagnet, an armature supported in operative relation to the effective poles by resilient means carried by such plate, a permanent magnet for polarizing the armature, a clapper carried by the armature and adapted to strike the gongs, such resilient means adapted to move the armature to its intermediate or normal position after each current impulse when the electromagnets are energized by means of alternating currents, and means for adjusting such resilient supporting means relatively to such plate to vary the magnetic effort exerted upon the armature by a given energizing current in the electromagnets.

10. In a telephone ringer, the combination of a pair of electromagnets, a yoke of magnetic material connecting adjacent ends of the electromagnets, a pair of gongs rigidly supported from such yoke, a plate supported from the effective ends of such electromagnet, an armature supported in operative relation to the effective poles by resilient means carried by such plate, a permanent magnet for polarizing the armature, a clapper carried by the armature and adapted to strike the gongs, such resilient means adapted to move the armature to its intermediate or normal position after each current impulse when the electromagnets are energized by means of alternating currents, and means for adjusting such resilient supporting means angularly relative to such plate to equalize the magnetic efforts exerted by the two effective poles upon the armature by a given energizing current in the electromagnets.

11. In a telephone ringer, the combination of a pair of electromagnets, a yoke of magnetic material connecting adjacent ends of the electromagnets, a pair of gongs rigidly supported from such yoke, a plate supported from the effective ends of such electromagnet, an armature supported in operative relation to the effective poles by resilient means carried by such plate, a permanent magnet for polarizing the armature, a clapper carried by the armature and adapted to strike the gongs, such resilient means adapted to move the armature to its intermediate or normal position after each current impulse when the electromagnets are energized by means of alternating currents, and means for adjusting such resilient supporting means angularly relative to such plate to render unequal the magnetic efforts exerted by the two effective poles upon the armature by a given energizing current in the electromagnets.

12. In a telephone ringer, the combination of a pair of electromagnets, a yoke of magnetic material connecting adjacent ends of the electromagnets, a pair of gongs rigidly supported from such yoke, a plate supported from the effective ends of such electromagnets, an armature supported in operative relation to the effective poles by resilient means carried by such plate, a clapper carried by the armature and adapted to strike the gongs, such resilent means adapted to maintain the clapper between and out of contact with the gongs when the electromagnets are not energized, means for adjusting such resilient supporting means relatively to such plate to vary the magnetic effort exerted upon the armature by a given energizing current in the electromagnets, and clamping means for holding such resilient supporting means in any desired adjustment.

13. In a telephone ringer, the combination of a pair of electromagnets, a yoke of magnetic material connecting adjacent ends of the electromagnets, a pair of gongs rigidly supported from such yoke, a plate supported from the effective ends of such electromagnets, an armature supported in operative relation to the effective poles by resilient means carried by such plate, a clapper carried by the armature and adapted to strike the gongs, such resilient means adapted to maintain the clapper between and out of contact with the gongs when the electromagnets are not energized, means for adjusting such resilient supporting means angularly relative to such plate to equalize the magnetic efforts exerted by the two effective poles upon the armature by a given energizing current in the electromagnets, and clamping means for holding such resilient supporting means in any desired adjustment.

14. In a telephone ringer, the combination of a pair of electromagnets, a yoke of magnetic material connecting adjacent ends of the electromagnets, a pair of gongs rigidly supported from such yoke, a plate supported from the effective ends of such electromagnets, an armature supported in operative relation to the effective poles by resilient means carried by such plate, a clapper carried by the armature and adapted to strike the gongs, such resilient means adapted to maintain the clapper between and out of contact with the gongs when the electromagnets are not energized, means for adjusting such resilient supporting means angularly relative to such plate to render unequal the magnetic efforts exerted by the two effective poles upon the armature by a given energizing current in the electromagnets, and clamping means for holding such resilient supporting means in any desired adjustment.

In witness whereof I have hereunto set my hand in the presence of two subscribing witnesses this 19th day of November 1906.

ELBERT RADOLPH HOBBS.

Witnesses:

A. M. O'DONNELL,

W. E. FEE.